(12) United States Patent
Bhatt et al.

(10) Patent No.: US 11,093,886 B2
(45) Date of Patent: Aug. 17, 2021

(54) METHODS FOR REAL-TIME SKILL ASSESSMENT OF MULTI-STEP TASKS PERFORMED BY HAND MOVEMENTS USING A VIDEO CAMERA

(71) Applicant: FUJIFILM Business Innovation Corp., Tokyo (JP)

(72) Inventors: Chidansh Amitkumar Bhatt, Mountain View, CA (US); Patrick Chiu, Mountain View, CA (US); Chelhwon Kim, Palo Alto, CA (US); Qiong Liu, Cupertino, CA (US); Hideto Oda, Kanagawa (JP); Yanxia Zhang, Cupertino, CA (US)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 62 days.

(21) Appl. No.: 16/201,868

(22) Filed: Nov. 27, 2018

(65) Prior Publication Data

US 2020/0167715 A1    May 28, 2020

(51) Int. Cl.
| | |
|---|---|
| *G06Q 10/06* | (2012.01) |
| *G06K 9/00* | (2006.01) |
| *G06N 20/00* | (2019.01) |
| *G06N 3/08* | (2006.01) |
| *G06N 5/04* | (2006.01) |

(52) U.S. Cl.
CPC ... *G06Q 10/06398* (2013.01); *G06K 9/00355* (2013.01); *G06N 3/08* (2013.01); *G06N 5/046* (2013.01); *G06N 20/00* (2019.01); *G06Q 10/0633* (2013.01)

(58) Field of Classification Search
USPC .................................................. 705/7.42
See application file for complete search history.

(56) References Cited

U.S. PATENT DOCUMENTS

| | | | | |
|---|---|---|---|---|
| 2009/0219131 | A1* | 9/2009 | Barnett | G16H 40/20 340/5.2 |
| 2010/0117836 | A1* | 5/2010 | Seyed Momen | G16H 40/20 340/573.1 |

(Continued)

OTHER PUBLICATIONS

Pradhan et al. (B. R. Pradhan, Y. Bethi, S. Narayanan, A. Chakraborty and C. S. Thakur, "N-HAR: A Neuromorphic Event-Based Human Activity Recognition System using Memory Surfaces," 2019 IEEE International Symposium on Circuits and Systems (ISCAS), Sapporo, Japan, May 1, 2019, pp. 1-5, doi: 10.1109/ISCAS.2019. 87025.*

(Continued)

*Primary Examiner* — Matthew D Henry
(74) *Attorney, Agent, or Firm* — Procopio, Cory, Hargreaves & Savitch LLP (57) ABSTRACT

Example implementations described herein are directed to systems and methods for skill assessment, such as hand washing compliance in hospitals, or assembling products in factories. Example implementations involve body part tracking (e.g., hands), skeleton tracking and deep neural networks to detect and recognize sub-tasks and to assess the skill on each sub-task. Furthermore, the order of the sub-tasks is checked for correctness. Beyond monitoring individual users, example implementations can be used for analyzing and improving workflow designs with multiple sub-tasks.

13 Claims, 7 Drawing Sheets

(56) References Cited

U.S. PATENT DOCUMENTS

2010/0167248 A1\* 7/2010 Ryan .................. H04N 7/181 434/262
2014/0072172 A1\* 3/2014 Du .................. G06K 9/00261 382/103

OTHER PUBLICATIONS

Bai, S., et al., An Empirical Evaluation of Generic Convolutional and Recurrent Networks for Sequence Modeling, arXiv:1803.01271, Apr. 19, 2018, 14 pgs.

Chiu, P., et al., Recognizing Gestures on Projected Button Widgets with an RGB-D Camera Using a CNN, ISS '18, Nov. 25-28, 2018, Tokyo Japan, 6 pgs.

Doughty, H., et al., Who's Better, Who's Best: Skill Determination in Video Using Deep Ranking, arXiv:1703.09913, 2018, 10 pgs.

Farneback, G., Two-Frame Motion Estimation Based on Polynomial Expansion, Image Analysis, SCIA 2003, Lecture Notes in Computer Science, 2749, pp. 363-370.

Kim, S. T., et al., EvaluationNet: Can Human Skill be Evaluated by Deep Networks?, arXiv:1705.11077, 2017, 8 pgs.

Lecun, Y., et al., Deep Learning, Nature, 521, 2015, pp. 436-444.

Mueller, F., et al., GANerated Hands for Real-Time 3D Hand Tracking from Monocular RGB, arXiv:1712.01057, 2017, 11 pgs.

Simonyan, K., et al., Two-Stream Convolutional Networks for Action Recognition in Videos, arXiv:1406.2199, 2014, 9 pgs.

Wang, H., et al., Action Recognition with Improved Trajectories, 2013 IEEE International Conference on Computer Vision, Dec. 1-8, 2013, Sydney, NSW, Australia, pp. 3551-3558.

Yang, Z., et al., Action Recognition with Spatio-Temporal Visual Attention on Skeleton Image Sequences, arXiv:1801.10304, Apr. 11, 2018, 10 pgs.

Yuan, S., et al., Depth-Based 3D Hand Pose Estimation: From Current Achievements to Future Goals, arXiv:1712.03917, 2018, pp. 2636-2645.

Zimmermann, C., et al., Learning to Estimate 3D Hand Pose from Single RGB Images, arXiv:1705.01389, 2017, pp. 4903-4911.

\* cited by examiner

Palm to palm with fingers interlaced;

FIG. 1(a)

Backs of fingers to opposing palms with fingers interlocked;

METHODS FOR REAL-TIME SKILL ASSESSMENT OF MULTI-STEP TASKS PERFORMED BY HAND MOVEMENTS USING A VIDEO CAMERA

BACKGROUND

Field

The present disclosure is generally related to camera systems, and more specifically, to task detection and skill assessment through use of camera systems.

Related Art

Skill assessment using video cameras can be used for checking whether a task has been performed and evaluating how well it has been performed. Skill assessment systems have useful applications for quality control, compliance, training, improving efficiency and well-being of workers.

In the related art, algorithms have been proposed to determine the skill by deep ranking and computing semantic similarity of tasks and sub-tasks. These related art methods often require the video to be individual videos of a single task, or manually pre-segmented video clips of sub-tasks.

SUMMARY

For a more realistic situation with a video stream of a complex task that has sub-tasks, skill assessment for such complex tasks remains unaddressed. Further, another problem with the related art involves analyzing the task workflow design. For example, when a task workflow with multiple sub-tasks in a factory is changed periodically, it needs to be monitored so that the workflow can be adjusted and improved. In the related art, the changes are done with video cameras and manually annotated. A more automated system is needed for such implementations.

Example implementations described herein are directed to addressing the above problem through deep learning methods. One method is a bottom-up approach that labels the video frames with sub-task labels (using a Convolutional Neural Network (CNN) and optical flow), then the sequential frames are grouped into sub-task events for which skill assessment scores are computed (e.g., using deep ranking), and the sub-task events are grouped into task events for which sub-task completion and sub-task order are checked. Another method is a more specialized architecture using Temporal Convolutional Nets (TCNs) of 3D hand movements based on skeleton tracking. The methods are described in detail in the following disclosure.

Aspects of the present disclosure involve a method, involving detecting, from a camera system, a body part of a user associated with a task to be completed; grouping sequential frames received from the camera system into a plurality of sub-tasks of the task to be completed based on an application of a machine learning model configured to associate each of the plurality of subtasks to the sequential frames; and providing an evaluation of completion of the task based on detection of completion for the plurality of sub-tasks and order correctness of the sub-tasks.

Aspects of the present disclosure further involve a computer program having instructions involving detecting, from a camera system, a body part of a user associated with a task to be completed; grouping sequential frames received from the camera system into a plurality of sub-tasks of the task to be completed based on an application of a machine learning model configured to associate each of the plurality of subtasks to the sequential frames; and providing an evaluation of completion of the task based on detection of completion for the plurality of sub-tasks and order correctness of the sub-tasks.

Aspects of the present disclosure involve a system, involving means for detecting, from a camera system, a body part of a user associated with a task to be completed; means for grouping sequential frames received from the camera system into a plurality of sub-tasks of the task to be completed based on an application of a machine learning model configured to associate each of the plurality of subtasks to the sequential frames; and means for providing an evaluation of completion of the task based on detection of completion for the plurality of sub-tasks and order correctness of the sub-tasks.

Aspects of the present disclosure involve a system, involving a camera system; and a processor, configured to detect, from the camera system, a body part of a user associated with a task to be completed; group sequential frames received from the camera system into a plurality of sub-tasks of the task to be completed based on an application of a machine learning model configured to associate each of the plurality of subtasks to the sequential frames; and provide an evaluation of completion of the task based on detection of completion for the plurality of sub-tasks and order correctness of the sub-tasks.

DETAILED DESCRIPTION

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

To further focus the problem, we will be considering tasks performed with the hands, or with hands and tools. Examples of domains include hand hygiene compliance in a hospital (FIGS. 1(a), 1(b), 2(a) and 2(b)), and assembling objects in a factory or home (FIGS. 3(a), 3(b) 4(a), 4(b)).

Figure 1A:
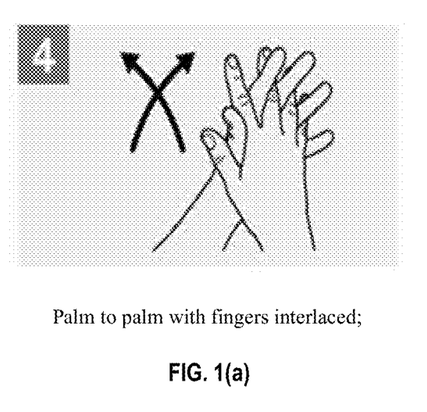
FIGS. 1(a) and 1(b) illustrate an example handwashing procedure.
Figure 1B:
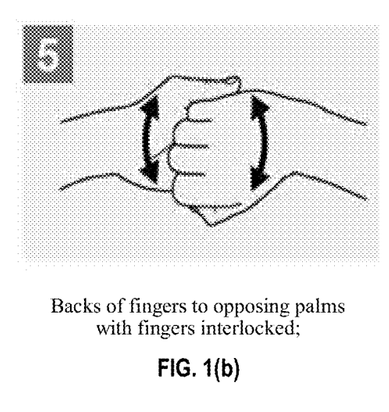

FIGS. 1(a) and 1(b) illustrate an example handwashing procedure. Specifically, FIG. 1(a) illustrates a sample step four of the eleven step procedure for hand hygiene according to the World Health Organization Hand Hygiene Brochure, and FIG. 1(b) illustrates step five. As the hand washing procedure is an eleven step procedure, step four can be designated as sub-task four, and step five can be designated as sub-task five of the hand washing procedure. Similarly, FIGS. 3(a) and 3(b) illustrate example assembly instructions for a product, which involves multiple steps.

Example implementations are directed to methods for skill assessment of tasks performed by body parts such as hands. The tasks can involve hand washing compliance in hospitals, or assembling products in factories, or use of tools. Existing methods often work with video clips in a dataset which are manually segmented, and with simpler tasks as opposed to complex processes with multi-step sub-tasks. To address such issues, example implementations apply hand tracking and skeleton tracking and deep neural networks to detect and recognize sub-tasks and to assess the skill on each sub-task. Furthermore, the order of the sub-tasks is checked for correctness. Beyond monitoring individual users, our methods can be used for analyzing and improving workflow designs with multiple sub-tasks.

Figure 2A:
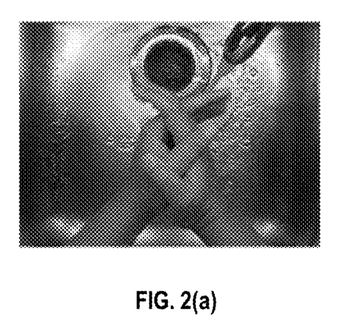
FIGS. 2(a) and 2(b) illustrate example images of hand washing as captured by the camera system in accordance with an example implementation.
Figure 2B:
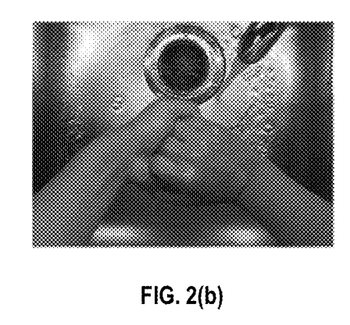
Figure 3A:
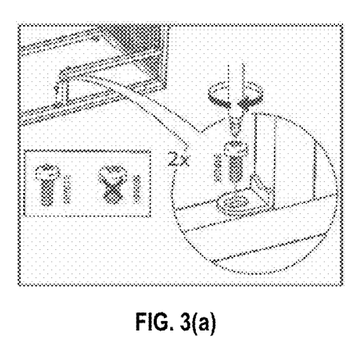
FIGS. 3(a) and 3(b) illustrate example assembly instructions for a product.
Figure 3B:
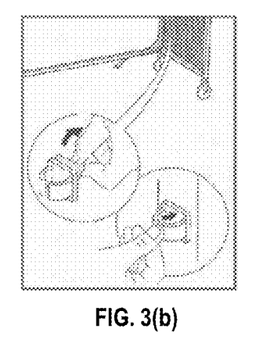
Figure 4A:
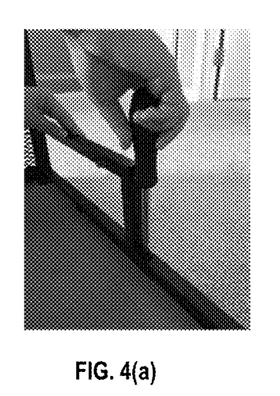
FIGS. 4(a) and 4(b) illustrate example images of an assembly task as captured by the camera system in accordance with an example implementation
Figure 4B:
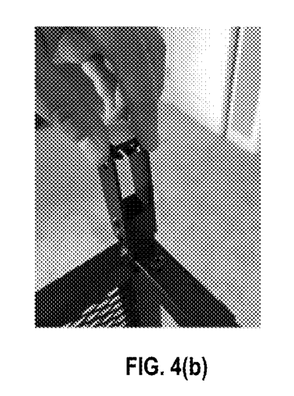

Examples of images for hand washing as captured by the camera system are shown in FIGS. 2(a) and 2(b) for the sub-tasks of FIGS. 1(a) and 1(b) respectively, and for the assembly task as captured by the camera system in FIGS. 4(a) and 4(b) for the sub-tasks of FIGS. 3(a) and 3(b), respectively.

Figure 5A:
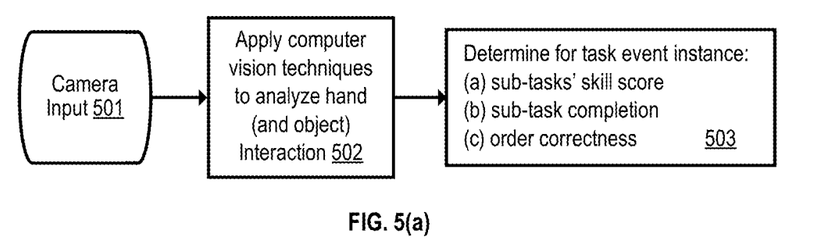
FIGS. 5(a) and 5(b) illustrate example flow diagrams of the system, in accordance with an example implementation.

FIGS. 5(a) and 5(b) illustrate example flow diagrams of the system, in accordance with an example implementation. Specifically, FIG. 5(a) illustrates an example flow diagram for analyzing sub-task instances in real time, in accordance with an example implementation. Task instances performed by individual users are analyzed in real-time with respect to the sub-tasks. In the example of FIG. 5(a), images from the camera 501 are input, such as images as shown in FIGS. 2(a) and 2(b), or FIGS. 4(a) and 4(b). At 502, computer vision techniques to analyze body part (e.g., hand) interaction with objects or actions performed therein. At 503, for the particular task event instance, the skill score of each sub-task, the order correctness of the sub-tasks, and the completion of the sub-tasks are determined.

Figure 5B:
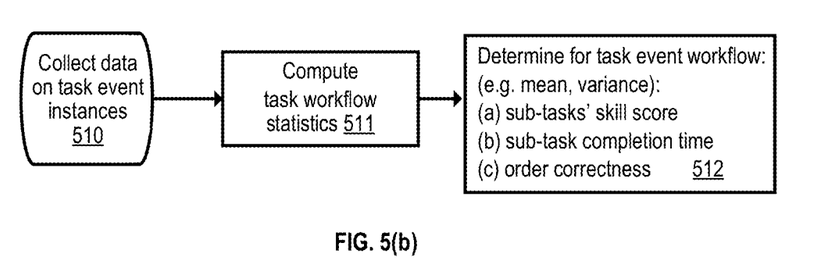

FIG. 5(b) illustrates an example flow diagram for analyzing the workflow of sub-tasks, in accordance with an example implementation. The task workflow is analyzed by collecting data on the task instances over time. At 510, the data on the task event instances determined from the flow of 503 of FIG. 5(a) are collected. At 511, the task workflow statistics are calculated. At 512, for the task event workflow for the desired statistic (e.g., mean, variance), the sub-task skill score, completion time, and order correctness are computed.

Figure 6:
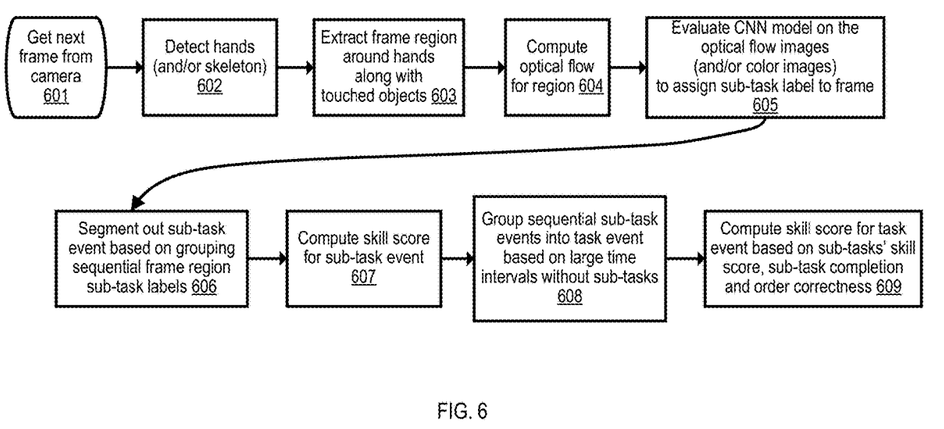
FIG. 6 illustrates an example flow diagram for frame labeling, in accordance with an example implementation.

FIG. 6 illustrates an example flow diagram for frame labeling, in accordance with an example implementation. For the proposed frame labeling method is a bottom-up approach where labeled frames are grouped into sub-task events, which are aggregated into task events. The processing pipeline is shown in the flowchart in FIG. 6.

In example implementations, the camera may be a low-cost web camera, a video camera, or a Red Green Blue-Depth (RGB-D) camera. With the RGB-D camera, an additional depth channel provides a stream of grayscale depth frame images, and they are processed similarly as the color channel frame images.

In example implementations, the first part of the pipeline is to obtain the current video frame at 601 and extract a region around the hands where the action is at 603, using a hand detection algorithm at 602. Depending on the desired implementation, these processes may be skipped if the camera is set up to capture only the relevant part of the scene, e.g. a camera mounted above a sink for hand washing, or mounted above a workbench for assembly tasks. In the former case, only detection is required, which is more robust than hand pose or skeleton estimation; in the latter case, no hand detection or pose estimation is required, which improves robustness when there are occlusions or hand-object interactions.

The next step in the processing is to compute the dense optical flow over the frame region at 604. One motivation for using optical flow is that it is robust against different background scenes, which helps in supporting different settings. Another motivation is that it is robust against small amounts of occlusion and noise, which can help deal with noisy images such as soapy water on the hands. The optical flow approach has been shown to work successfully for action recognition in videos. To compute the optical flow, implementations such as the Farnebäck algorithm in the OpenCV computer vision library can be utilized. The optical flow processing produces an x-component image and a y-component image.

At 605, example implementations classify the optical flow images using a Convolutional Neural Network (CNN) to assign sub-task labels to the frames. For the CNN architecture, a standard architecture with two alternating convolution and max-pooling layers is utilized, followed by a dense layer and a softmax layer, through any desired deep learning toolkit that is suitable for integration with real-time interactive applications.

A contiguous sequence of frame regions with activity over them accumulate in a buffer and such frames are grouped into sub-task events at 606. Each event buffer is classified and given a sub-task label by taking a vote of the classification sub-task labels of the frame regions. Each optical flow component of a frame is voted on separately. Alternatively, example implementations described herein can perform fusion on the optical flow components to obtain a single label per frame; one example implementation involves adding a fully connected network on the outputs of each flow component.

For each sub-task event, which is a video segment, a skill assessment algorithm can be applied to give a skill score at 607. The skill assessment algorithm can be implemented in any manner according to the desired implementation.

The sub-tasks are in turn grouped into task events by determining task time boundaries based on the observation that task events are separated by time periods without activity or motion at 608.

Finally, each task event is assigned a skill score based on the skill scores of the sub-tasks at 609. Depending on the desired implementations, alerts can also be raised if a sub-task is not completed, and in cases where sub-task order matters if the sub-tasks are performed out of order.

In example implementations, Temporal Convolutional Nets (TCNs) of 3D hand movements can be utilized. The example implementations described herein involve a video stream and extract 3D skeleton joints as feature representations in real time. Recent advances in real-time 3D hand tracking show that skeleton joints can be reliably detected and also require less computation compared to optic flow.

Figure 7:
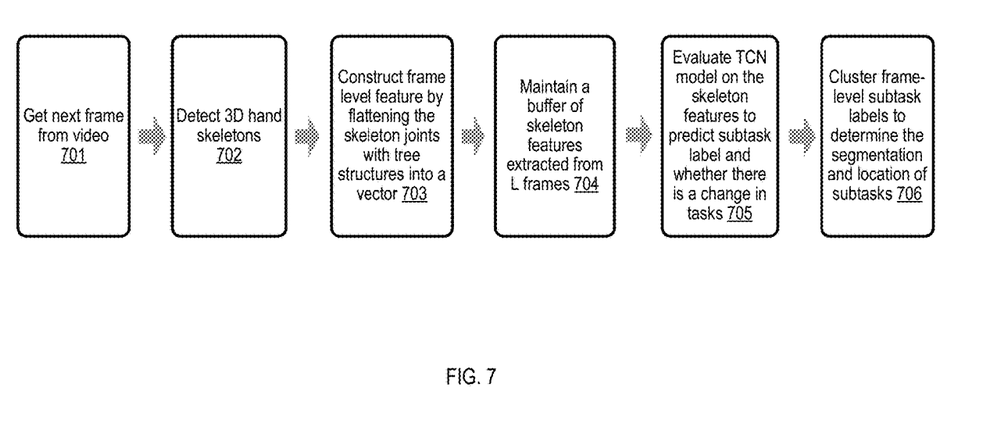
FIG. 7 illustrates an example flow diagram involving temporal convolutional nets, in accordance with an example implementation.

FIG. 7 illustrates an example flow diagram involving temporal convolutional nets, in accordance with an example implementation.

For each frame obtained from the video at 701, example implementations extract both the 2D and 3D positions of hand joints (e.g., 21 hand joints) from each hand to detect the 3D hand skeletons at 702. At 703, the flow flattens the skeleton locations into a vector using a tree structure to maintain the spatial hierarchical relations. The tree structure assets are utilized in maintaining a sequence of skeleton vectors extracted from L video frames at 704.

At 705, to predict the subtask per frame, example implementations can involve a sequence prediction approach. Convolutional neural nets can outperform recurrent neural nets for many sequence problems in language and activity recognitions. In example implementation, a temporal convolutional net (TCN) architecture is adopted to predict subtasks which demonstrates to be both faster and achieve better accuracy compared to recurrent networks.

Suppose that input skeleton sequences from L video frames are received and that two labels are to be predicted <subtask, isChange> from frame 1 to L. This can be achieved via the TCN architecture, which ensures equal number of input and output lengths. One of the possible implementations is to adapt the network structure from the open source TCN library. For instance, the network can use a dilated casual convolution with dilation factors of 1, 2, 4, 8, which starts with a 1D fully-convolutional network with each hidden layer the same size the input layer, then causes a dilated convolution with zero padding to keep the subsequent layers the same length.

At 706, the final step is to cluster the frame-based prediction of subtasks to task, which can be conducted according to any desired implementation.

Through the example implementations of FIG. 7, a machine learning algorithm can be generated and trained to detect sub-tasks based on camera feed accordingly. The machine learning algorithm is generated from using the temporal features directly in a deep learning algorithm using the temporal convolutional networks of FIG. 7 as well as the skeletons of the hand or the body part that is to be learned. Such example implementations are an improvement to the related art as the information for sub-tasks is isolated and leveraged into the deep learning algorithm.

Figure 8:
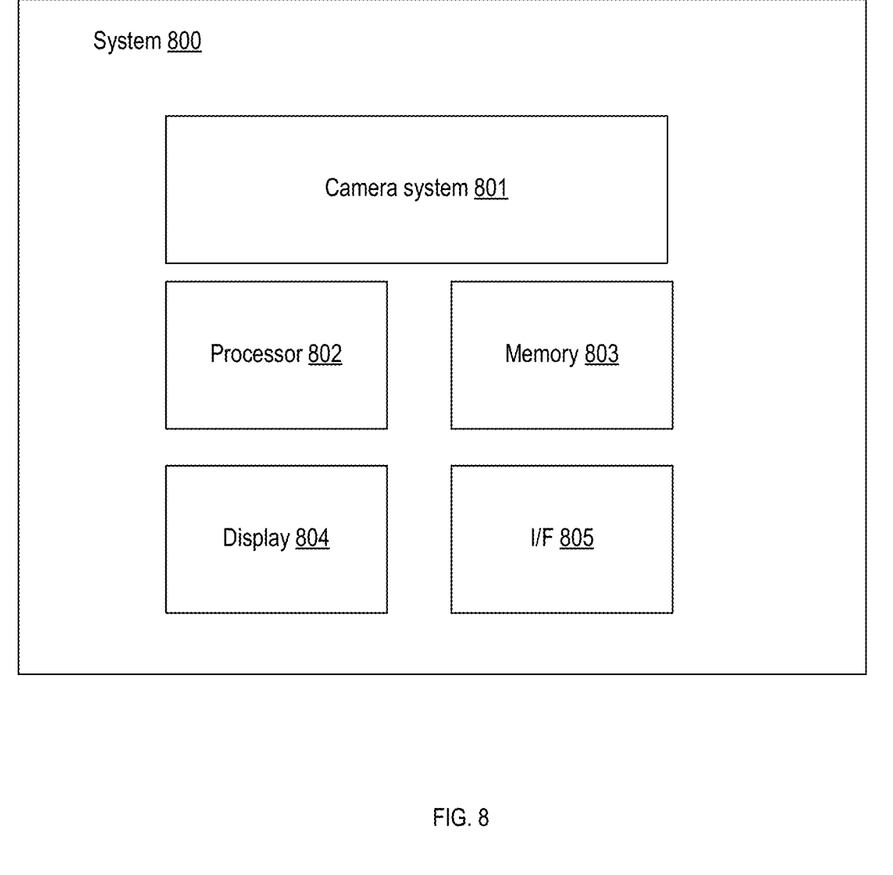
FIG. 8 illustrates an example hardware diagram of a system involving a camera setup, in accordance with an example implementation.

FIG. 8 illustrates an example hardware diagram of a system involving a camera setup, in accordance with an example implementation. System 800 can include a camera system for task capture 801, a processor 802, memory 803, a display 804, and an interface (I/F) 805. The system 800 is configured to monitor a task and can be associated with a workstation, a particular apparatus (e.g., a sink, a factory line location, etc.) and so on according to the desired implementation.

The camera system 801 can be in any form that is configured to capture video image and depth image according to the desired implementation. In an example implementation, processor 802 may utilize the camera system to capture images of tasks being performed. Display 804 can be in the form of a touchscreen or any other display for video conferencing or for displaying results of a computer device, in accordance with the desired implementation. Display 804 can also include a set of displays with a central controller that provide feedback to the user executing tasks (e.g., recommended corrected action, indication as to whether completion of subtask was detected or not). I/F 805 can include interface devices such as keyboards, mouse, touchpads, or other input devices for display 804 depending on the desired implementation.

In example implementations, processor 802 can be in the form of a central processing unit (CPU) including physical hardware processors or the combination of hardware and software processors. Processor 802 is configured to take in the input for the system, which can include camera images from the camera 801 for subtasks. Processor 802 can process the completion of subtasks through utilization of a deep learning recognition algorithm as described herein. Depending on the desired implementation, processor 802 can be replaced by special purpose hardware to facilitate the implementations of the deep learning recognition, such as a dedicated graphics processing unit (GPU) configured to process the images for recognition according to the deep learning algorithm, a field programmable gate array (FPGA), or otherwise according the desired implementation. Further, the system can utilize a mix of computer processors and special purpose hardware processors such as GPUs and FPGAs to facilitate the desired implementation.

As described herein processor 802 can be configured to execute the flow of FIG. 6 and FIG. 7. Processor 802 can be configured to detect, from the camera system 801, a body part of a user associated with a task to be completed; group sequential frames received from the camera system into a plurality of sub-tasks of the task to be completed based on an application of a machine learning model configured to associate each of the plurality of subtasks to the sequential frames; and provide an evaluation of completion of the task based on detection of completion for the plurality of sub-tasks and order correctness of the sub-tasks as illustrated in the flow of FIG. 6. Although body parts in the example implementations are described with respect to hands, other body parts (e.g., feet, arms, etc.) may also be utilized for completing a task, and the present disclosure is not limited thereto. Further, multiple body parts (e.g., hands in conjunction with feet) can be detected through example implementations described herein.

Processor 802 can be configured to detect, from the camera system, the body part of the user associated with the task to be completed through extracting a frame region around the body part for each frame of the camera system as illustrated in the flow of FIG. 6.

Processor 802 can be configured to group the sequential frames received from the camera system into the plurality of sub-tasks of the task to be completed based on the application of the machine learning model configured to associate each of the plurality of sub-tasks to the sequential frames by applying the machine learning model to associate the each of the plurality of sub-tasks to the sequential frames through labeling each of the sequential frames; segmenting out each of the plurality of sub-tasks based on grouping of labels of the sequential frames; and grouping sequential ones of the segmented plurality of sub-tasks as the task to be completed as illustrated in the flow of FIGS. 6 and 7.

Processor 802 can be configured to provide the evaluation of completion of the task based on detection of completion for the plurality of sub-tasks and order correctness of the sub-tasks by identifying the order correctness from the grouping of sequential ones of the plurality of sub-tasks; identifying completion for each of the plurality of sub-tasks through an application of a computer vision algorithm on corresponding ones of the labeled sequential frames; and computing another skill score for the task to be completed based on the identifying of the order correctness, the completion of the each of the plurality of sub-tasks, and a skill score for the each of the plurality of sub-tasks as illustrated in FIG. 6.

In example implementations, the body part of the user can involve hands of the user, wherein the task to be completed is hand washing, wherein the plurality of sub-tasks are steps for conducting the hand washing as illustrated in FIGS. 1(a), 1(b), 2(a) and 2(b).

Further, objects associated with the task (e.g. sink, screwdriver, etc.) can be detected in accordance with the desired implementation. Processor 802 is configured to detect, from the camera system, the body part of the user associated with the task to be completed by detecting one or more associated objects with the task, and extracting a frame region around the body part and the one or more associated objects for each frame of the camera system as illustrated in the example of FIGS. 3(a), 3(b), 4(a), and 4(b).

Through the example implementations described herein, a technological solution can be provided to address the issue of determining whether users being monitored by the system are performing a task in a correct manner. In situations such as hand washing or manufacturing assembly, such detection systems are necessary to ensure compliance with regulations or that the most efficient method is properly being carried out.

Further, through the scoring system as described herein, the sub-task times and scores can be monitored to determine bottlenecks in the procedure given to users. Such implementations allow for immediate identification of possible ways to modify the task, to determine if further training is needed, or if certain sub-tasks should be removed or modified to improve efficiency of the given process.

As described herein, example implementations can involve hand washing or factory settings in which users assemble objects or perform tasks according to a set of sub-tasks. Through the example implementations described herein, a real time system can be implemented that monitors the users as they are performing the tasks. Such an implementation is an improvement over related art implementations as specific sub-tasks are isolated and detected to ensure compliance with the particular routine for the task.

Further, in example implementations described herein, a skill assessment score can be provided to the user to indicate how well they performed a particular sub-task in real time. Such example implementations address assembly lines that are reconfigured over various periods of time (e.g., every few months), as feedback can be provided to determine how the workflow for the task should be adjusted as well as how well people are performing the tasks and which sub-tasks create bottlenecks or are conducted poorly. With such feedback, the task to be performed can be adjusted accordingly, which leads to more efficiency in assembly lines.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
analyzing a plurality of image frames, received from a camera system, using computer vision techniques to detect, in the plurality of image frames, a body part of a user associated with a task to be completed;
grouping sequential image frames of the plurality of image frames received from the camera system into a plurality of sub-tasks of the task to be completed based on an application of a machine learning model configured to associate each of the plurality of subtasks to the sequential image frames, said grouping comprises:
computing a dense optical flow over the plurality of image frames, computing the dense optical flow comprises producing x-component and a y-component images for each of the plurality of image frames;
associating each of the plurality of sub-tasks to sequential image frames through assigning sub-task labels to each of the sequential image frames based on using the machine learning model to classify each of the x-component and y-component of the sequential image frames using the machine learning model,
segmenting out each of the plurality of sub-tasks based on grouping the sub-task labels of the sequential image frames, and
grouping sequential ones of the segmented plurality of sub-tasks as the task to be completed; and
providing an evaluation of completion of the task based on detection of completion for the plurality of sub-tasks and order correctness of the sub-tasks, said evaluation comprises:
identifying an order of correctness of the sub-tasks from the grouping of sequential ones of the plurality of sub-tasks,
identifying completion for each of the plurality of sub-tasks through an application of a computer vision algorithm on corresponding ones of the labeled sequential image frames, and
computing a skill score for the task to be completed based on the identified order of correctness, the identified completion of the each of the plurality of sub-tasks, and a skill score for the each of the plurality of sub-tasks.

2. The method of claim 1, wherein the detecting from the camera system, the body part of the user associated with the task to be completed comprises extracting a frame region around the body part for each image frame of the camera system.

3. The method of claim 1, wherein the body part of the user comprises hands of the user, wherein the task to be completed is hand washing, wherein the plurality of sub-tasks comprises steps for conducting the hand washing.

4. The method of claim 1, wherein the detecting, from the camera system, the body part of the user associated with the task to be completed further comprises:
detecting one or more associated objects with the task, and
extracting a frame region around the body part and the one or more associated objects for each image frame of the camera system.

5. The method of claim 1, further comprises training the machine learning model to detect sub-tasks by detecting the body part in the plurality of image frames, constructing image frame level features of respective image frames by flattening the body part with tree structures into a vector, maintain a buffer of image frame level features from a number of frames, evaluating the machine learning model on the image frame level features to predict sub-task labels and whether there is a change in sub-task, and clustering frame-level sub-tasks to determine segmentation and location of sub-tasks.

6. A non-transitory computer readable medium, storing instructions for executing a process, comprising:
analyzing a plurality of image frames, received from a camera system, using computer vision techniques to detect, in the plurality of image frames, a body part of a user associated with a task to be completed;
grouping sequential image frames of the plurality of image frames received from the camera system into a plurality of sub-tasks of the task to be completed based on an application of a machine learning model configured to associate each of the plurality of subtasks to the sequential image frames, said grouping comprises:
computing a dense optical flow over the plurality of image frames, computing the dense optical flow comprises producing x-component and a y-component images for each of the plurality of image frames;
associating each of the plurality of sub-tasks to sequential image frames through assigning sub-task labels to each of the sequential image frames based on using the machine learning model to classify each of the x-component and y-component of the sequential image frames using the machine learning model,
segmenting out each of the plurality of sub-tasks based on grouping the sub-task labels of the sequential image frames, and
grouping sequential ones of the segmented plurality of sub-tasks as the task to be completed; and
providing an evaluation of completion of the task based on detection of completion for the plurality of sub-tasks and order correctness of the sub-tasks, said evaluation comprises:
identifying an order of correctness of the sub-tasks from the grouping of sequential ones of the plurality of sub-tasks,
identifying completion for each of the plurality of sub-tasks through an application of a computer vision algorithm on corresponding ones of the labeled sequential image frames, and
computing a skill score for the task to be completed based on the identified order of correctness, the identified completion of the each of the plurality of sub-tasks, and a skill score for the each of the plurality of sub-tasks.

7. The non-transitory computer readable medium of claim 6, wherein the detecting from the camera system, the body part of the user associated with the task to be completed comprises extracting a frame region around the body part for each image frame of the camera system.

8. The non-transitory computer readable medium of claim 6, wherein the body part of the user comprises hands of the user, wherein the task to be completed is hand washing, wherein the plurality of sub-tasks comprises steps for conducting the hand washing.

9. The non-transitory computer readable medium of claim 6, wherein the detecting, from the camera system, the body part of the user associated with the task to be completed further comprises:

detecting one or more associated objects with the task, and extracting a frame region around the body part and the one or more associated objects for each image frame of the camera system.

10. A system, comprising:

a camera system; and a processor, configured to:

analyze a plurality of image frames, received from a camera system, using computer vision techniques to detect, in the plurality of image frames, a body part of a user associated with a task to be completed;

group sequential image frames of the plurality of image frames received from the camera system into a plurality of sub-tasks of the task to be completed based on an application of a machine learning model configured to associate each of the plurality of sub-tasks to the sequential image frames, said grouping comprises:

compute a dense optical flow over the plurality of image frames, computing the dense optical flow comprises producing x-component and a y-component images for each of the plurality of image frames;

associate each of the plurality of sub-tasks to sequential image frames through assigning sub-task labels to each of the sequential image frames based on using the machine learning model to classify each of the x-component and y-component of the sequential image frames using the machine learning model,         segment out each of the plurality of sub-tasks based on grouping the sub-task labels of the sequential image frames, and         group sequential ones of the segmented plurality of sub-tasks as the task to be completed; and     provide an evaluation of completion of the task based on detection of completion for the plurality of sub-tasks and order correctness of the sub-tasks, said evaluation comprises:

identify an order of correctness of the sub-tasks from the grouping of sequential ones of the plurality of sub-tasks,         identify completion for each of the plurality of sub-tasks through an application of a computer vision algorithm on corresponding ones of the labeled sequential image frames, and         compute a skill score for the task to be completed based on the identified order of correctness, the identified completion of the each of the plurality of sub-tasks, and a skill score for the each of the plurality of sub-tasks.

11. The system of claim 10, wherein the processor is configured to detect, from the camera system, the body part of the user associated with the task to be completed through extracting a frame region around the body part for each image frame of the camera system.

12. The system of claim 10, wherein the body part of the user comprises hands of the user, wherein the task to be completed is hand washing, wherein the plurality of sub-tasks comprises steps for conducting the hand washing.

13. The system of claim 10, wherein the processor is configured to detect, from the camera system, the body part of the user associated with the task to be completed by:

detecting one or more associated objects with the task, and     extracting a frame region around the body part and the one or more associated objects for each image frame of the camera system.

* * * * *